No. 690,938. Patented Jan. 14, 1902.
C. FAREZ.
BELT FASTENER.
(Application filed July 8, 1901.)
(No Model.)

Witnesses:
H. B. Calderwood
G. L. Owens

Inventor:
C. Krist Farez

UNITED STATES PATENT OFFICE.

CHRIST FAREZ, OF TYRONE, PENNSYLVANIA.

BELT-FASTENER.

SPECIFICATION forming part of Letters Patent No. 690,938, dated January 14, 1902.

Application filed July 8, 1901. Serial No. 67,503. (No model.)

*To all whom it may concern:*

Be it known that I, CHRIST FAREZ, a citizen of the United States, residing at Tyrone, in the county of Blair and State of Pennsylvania, have invented certain new and useful Improvements in Belt-Fasteners, of which the following is a specification, reference being had to the accompanying drawings, forming part thereof.

Figure 1:
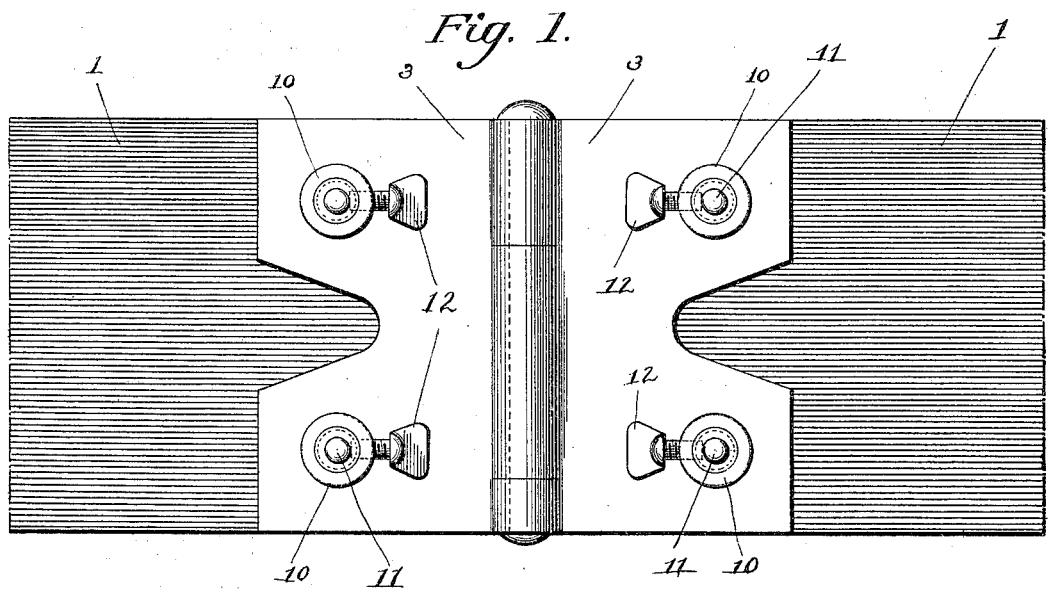
Figure 2:
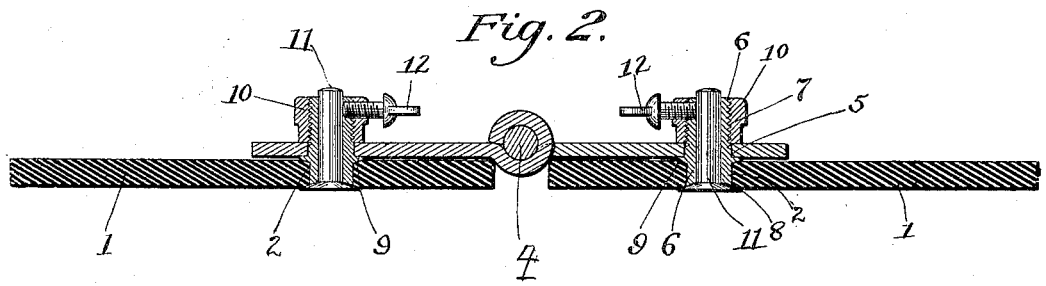

In the drawings, Figure 1 is a plan view of my improved belt-fastener. Fig. 2 is a vertical longitudinal section of the same through the fasteners.

1 represents a power-belt of approved construction, near the ends of which are formed suitable apertures or openings 2.

3 represents members constituting a hinge, which are secured together by means of the pintle 4, said members having suitable openings 5 near their outer ends, in each of which is seated a sleeve 6, the upper end of which is screw-threaded, as at 7, while the lower end of the sleeve is countersunk, as at 8. Said sleeve is provided with a collar or annular flange 9, adapted to bear against the under face of the hinge member, as clearly shown in Fig. 2.

10 is an annular clamping-nut having interior screw-threads adapted to intermesh with the screw-threads upon the upper end of the sleeve 2, thereby clamping said sleeve securely to the member 3 by reason of the impingement of the annular collar 9 upon the lower face of the member 3 and the impingement of said nut upon the upper face of said member.

11 is a pin or rivet passing entirely through the sleeve 2, the head of the same being countersunk in one end of said sleeve. The sleeve 2 and the annular nut 10 are each provided with a screw-threaded opening near the top, into which is secured a set-screw 12, the inner end of which is adapted to bite into the rivet, thereby firmly holding said rivet within said sleeve, thus securing the hinge members to the ends of the belt, the head of the rivet being materially larger than the circumference of the sleeve, whereby said head is in contact with the material forming the belt. In order to take the belt apart, it is only necessary to loosen the set-screw 12, whereby the rivet may be removed and the belt slipped off of the end of the sleeve.

What I claim, and desire to secure by Letters Patent, is—

1. In a belt-fastener, the combination with the hinge, of a sleeve secured in apertures formed in the leaves of said hinge, said sleeve extending beyond both faces of said leaves, means for clamping said leaves and means for securing one end of said sleeve to the end of a belt.

2. In a belt-fastener, the combination with a hinge, the leaves of which have apertures near their outer ends, of a sleeve secured in said apertures, an annular clamping-nut secured upon the upper end of said sleeve, a rivet passing through said sleeve and means for clamping said rivet in said sleeve.

3. In a belt-fastener, the combination with a hinge, the leaves of which have apertures formed near their outer ends, of sleeves secured in said apertures and extending from both sides of said leaves, an annular collar integral with said sleeve adapted to bear against one side of said leaves and a clamping-nut adjustable upon one end of said sleeve and adapted to bear upon the other face of said leaves, a rivet or pin adapted to pass through said sleeve and means for clamping said rivet in position.

4. In a belt-fastener, the combination with a hinge, the leaves of which have apertures near their outer ends, of a sleeve secured in said apertures and extending beyond the faces of said leaves, screw-threads formed on one of the ends of said sleeves, a countersink formed in the other end of said sleeve and an annular collar formed integral with the sleeve near the countersunk end, an annular clamping-nut adapted to be secured upon the screw-threaded end of the sleeve, a rivet adapted to enter said sleeve having a head of greater diameter than the sleeve, and a set-screw passing through said sleeve and annular nut and adapted to bite into said rivet, whereby the same is firmly secured in place.

In testimony whereof I have signed my name to this specification in the presence of two subscribing witnesses.

CHRIST FAREZ.

Witnesses:
G. L. OWENS,
H. B. CALDERWOOD.